United States Patent Office 2,701,627
Patented Feb. 8, 1955

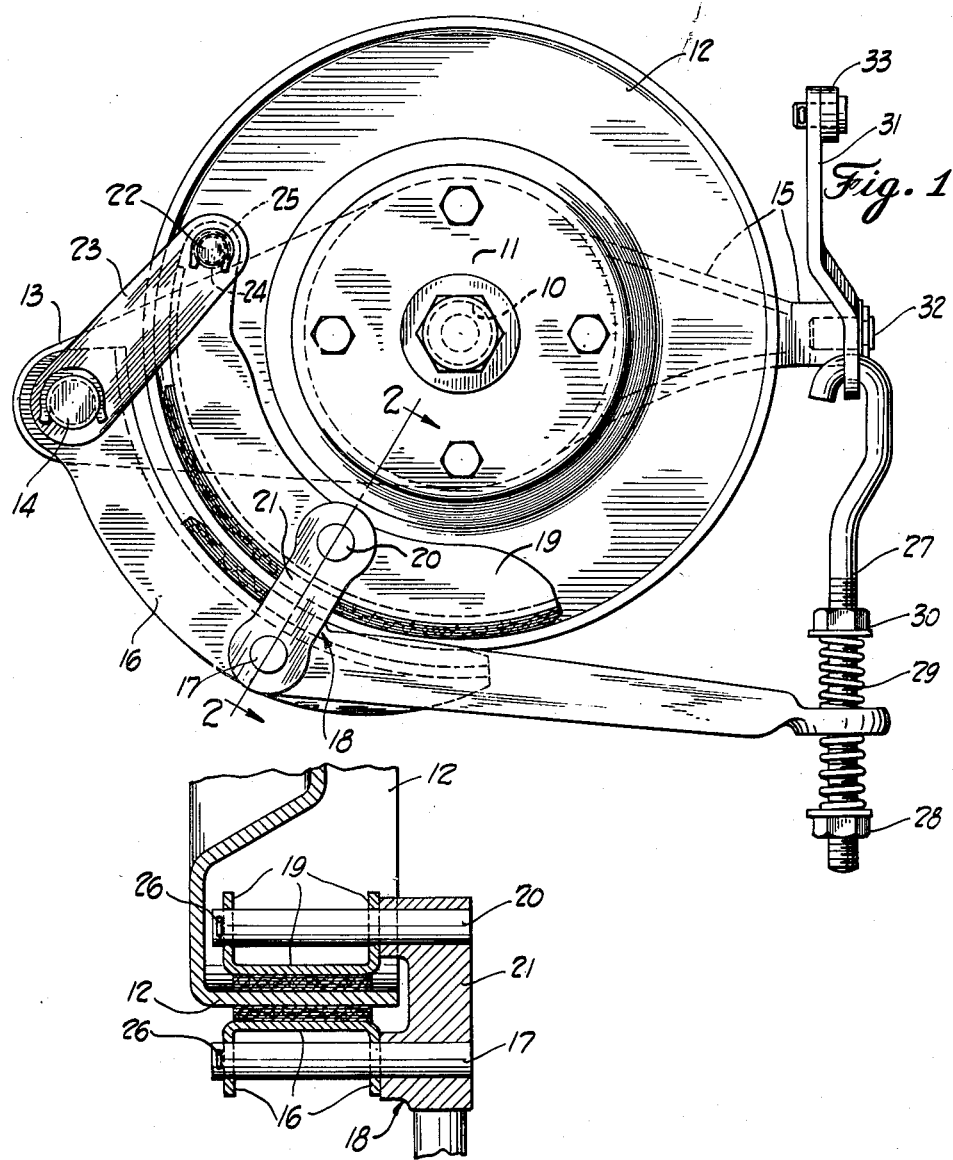

2,701,627

BRAKE FOR AUTOMOTIVE VEHICLES

John H. Murphy, Detroit, Mich., assignor to Detroit Duo-Grip Brake Corporation, Detroit, Mich., a corporation of Michigan Application June 30, 1953, Serial No. 365,195

4 Claims. (Cl. 188—76)

This invention relates to transmission brakes for automotive vehicles and more specifically to improvements in the brake shoe actuating mechanism therefor.

The primary object of the invention resides in the provision of linkage between the anchor post and inner brake shoe to restrain undue self-energization thereof when the vehicle is in motion in reverse gear, or permitted to roll backwards down a hill or other inclined surface.

Further objects of the invention contemplate the provision of a brake shoe equalizer which is sturdy of structure, light in weight, economic of manufacture, and efficient of operation.

Other objects and advantages more or less ancillary to the foregoing, and the manner in which all the various objects are realized will appear in the following description, which, considered in connection with the accompanying drawing, sets forth the preferred embodiment of the invention.

Referring to the drawing:

Fig. 1 is a side elevational view of the brake assembly illustrating the equalizer link in place therein; and Fig. 2 is a sectional view through the brake, the section being taken on a plane indicated by the line 2—2 in Fig. 1.

Referring first to Fig. 1, the transmission case (not shown) which may be of any conventional form is provided with a journal bearing for the reception of a drive shaft 10 having a flange 11 thereon for the support of a flanged brake drum 12. The transmission case embodies a transversely disposed arm 13 for the support of an anchor pin 14 and a diametrically opposed arm 15 for the support of the brake shoe linkage. The outer brake shoe 16 is mounted for pivotal movement upon the pin 14, and the opposed end portion thereof is bored for the reception of a pintle 17 formed in a brake actuating bell crank 18. The inner brake shoe 19 is pivotally supported on a second pintle 20 on the arm 21 of the bell crank 18, the opposed end of the shoe being pivotally mounted on a pin 22 affixed to a link 23 fulcrumed on the pin 14. The brake shoes are preferably fabricated from sheet metal stock die struck to the contour of the flanged face of the brake drum and of channeled transverse section. The webs of the arcuate channels are pierced to receive rivets for the retention of a friction material or so-called brake lining, and the flanged portions thereof are drilled and reamed to receive the pintles 17 and 20 and the pins 14 and 22 respectively. The pin 22 is formed with a groove 24 adjacent the free end thereof having a spring clip 25 therein to restrain lateral movement of the inner shoe. The pintles 17 and 20 are cross drilled in the end portions thereof for cotter pins 26 to retain the shoes in assembled relation. The outer end of the bell crank 18 is drilled and chamfered to receive the threaded end of a link 27 which is inserted therein and retained against axial movement by a nut 28 on the free end thereof and a spring 29 held in compressive engagement with the upper face of the bell crank by a nut 30. The link is coupled with a rocker plate 31 fulcrumed on a pin 32 in the arm 15 while the upper end of the plate is interlinked with a pull rod 33 connected to a brake lever of conventional form (not shown).

In operation the brake is applied by retraction of the pull rod 33 which effects the rotation of the bell crank 18 about the pintle 17 and the consequent depression of the shorter arm of the bell crank 18. As the pintles 17 and 20 approach the flange of the brake drum 12 the shoes 16 and 19 swing about their fulcrums 14 and 22 respectively into impinged relation with the brake drum. Since the ends of the brake shoes are pivotally connected to the anchor pin 14 free rocking movement thereof is restrained when the drum is rotated toward the leading edge thereof, and the shoes are thus held from swinging inwardly in wedged relation with the drum.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A transmission brake for a motor vehicle comprising a rotatable brake drum, a fixed anchor post adjacent thereto, an external brake shoe pivoted thereon, an internal brake shoe, a link connected to one end thereof and to said anchor post, a bell crank for actuating said shoes, and pintles on said bell crank disposed in straddled relation with said brake drum and pivotally connected with the respective brake shoes.

2. A brake for an automotive vehicle comprising a brake drum, a fixed anchor post adjacent the circumferential face thereof, an external brake shoe pivotally mounted thereon, a link pivotally mounted on said anchor post, an internal brake shoe pivotally mounted on said link, an arm disposed in radial relation to the drum, and pintles thereon pivotally engaged with said shoes.

3. A transmission brake for a motor vehicle comprising a rotatable brake drum, a fixed post adjacent thereto, an external brake shoe pivoted thereon, an internal brake shoe, a link connected to one end thereof and to said anchor post, and a forked lever pivotally coupled with said shoes.

4. A brake assembly comprising a rotatable drum, an external and internal brake shoe therefor, an arm transverse the rim of said drum, pintles thereon pivotally connected with said shoes, an actuating lever on said arm defining a bell crank, an anchor post adjacent said drum, a pivotal connection between said post and the external brake shoe, and a link pivotally connected with said post and the internal brake shoe.

References Cited in the file of this patent

UNITED STATES PATENTS

| 1,646,932 | Rosenberg | Oct. 25, 1927 |
| 1,936,569 | Bendix | Nov. 28, 1933 |
| 2,143,998 | Rosenberg | Jan. 17, 1939 |
| 2,239,977 | Rosenberg | Apr. 29, 1941 |
| 2,265,578 | Rosenberg | Dec. 9, 1941 |
| 2,654,445 | Oetzel | Oct. 6, 1953 |